(12) United States Patent
Meixner et al.

(10) Patent No.: US 12,346,528 B2
(45) Date of Patent: Jul. 1, 2025

(54) SYSTEMS AND METHODS FOR CHAT MESSAGE MANAGEMENT AND DOCUMENT GENERATION ON DEVICES

(71) Applicant: FUJIFILM Business Innovation Corp., Tokyo (JP)

(72) Inventors: Britta Meixner, Mountain View, CA (US); Scott Carter, Mountain View, CA (US); Matthew Lee, Mountain View, CA (US)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/351,836

(22) Filed: Jun. 18, 2021

(65) Prior Publication Data

US 2021/0311593 A1    Oct. 7, 2021

Related U.S. Application Data

(63) Continuation of application No. 15/285,878, filed on Oct. 5, 2016, now Pat. No. 11,042,256.

(51) Int. Cl.
*G06F 3/0481* (2022.01)
*G06F 3/04842* (2022.01)
(Continued)

(52) U.S. Cl.
CPC ............ *G06F 3/0481* (2013.01); *H04L 51/04* (2013.01); *H04L 51/216* (2022.05); *H04W 4/08* (2013.01); *H04W 4/12* (2013.01); *G06F 3/04842* (2013.01)

(58) Field of Classification Search
None
See application file for complete search history.

(56) References Cited

U.S. PATENT DOCUMENTS

| | | |
|---|---|---|
| 7,583,972 B2 | 9/2009 | Clipsham |
| 8,219,115 B1 | 7/2012 | Nelissen |
| (Continued) | | |

FOREIGN PATENT DOCUMENTS

| | | |
|---|---|---|
| JP | 2007241668 A | 9/2007 |
| JP | 2014-115855 A | 6/2014 |
| (Continued) | | |

OTHER PUBLICATIONS

Allan, J., et al., Taking Topic Detection From Evaluation to Practice, Proceedings of the 38th Hawaii International Conference on System Sciences, 4(04), 2005, 10 pgs.
(Continued)

*Primary Examiner* — Younes Naji
(74) *Attorney, Agent, or Firm* — PROCOPIO, CORY, HARGREAVES & SAVITCH LLP

(57) ABSTRACT

Systems and methods described herein are directed to implementations that facilitate individuals to collect, store, and automatically extract procedural knowledge from their messaging interactions with collaborative groups. Example implementations involve chat interfaces to communicate and add the capability to tag text and media to organize content. Example implementations also add a new thread-like structure to the previously only linear time-line of a chat. Knowledge from the chat can then be extracted automatically into a high-quality multimedia document.

18 Claims, 15 Drawing Sheets

(51) Int. Cl.
*H04L 51/04* (2022.01)
*H04L 51/216* (2022.01)
*H04W 4/08* (2009.01)
*H04W 4/12* (2009.01)

(56) References Cited

U.S. PATENT DOCUMENTS

| | | | |
|---|---|---|---|
| 8,558,693 | B2 | 10/2013 | Martin et al. |
| 9,686,087 | B2* | 6/2017 | Chang ................. H04L 12/1827 |
| 10,218,650 | B2 | 2/2019 | Kaminushi |
| 10,268,340 | B2 | 4/2019 | Chen et al. |
| 2005/0149621 | A1 | 7/2005 | Kirkland et al. |
| 2006/0123346 | A1 | 6/2006 | Totman et al. |
| 2007/0180040 | A1* | 8/2007 | Etgen ..................... H04L 51/234 |
| | | | 709/207 |
| 2008/0229214 | A1 | 9/2008 | Hamilton et al. |
| 2009/0083656 | A1 | 3/2009 | Dukhon et al. |
| 2009/0094329 | A1 | 4/2009 | Ambati et al. |
| 2009/0222763 | A1 | 9/2009 | Dukhon et al. |
| 2010/0093371 | A1 | 4/2010 | Gehrke et al. |
| 2011/0252138 | A1 | 10/2011 | Ahuja et al. |
| 2011/0296507 | A1 | 12/2011 | Khosrowshahi et al. |
| 2012/0317499 | A1* | 12/2012 | Shen ..................... G06Q 10/107 |
| | | | 715/752 |
| 2013/0198296 | A1* | 8/2013 | Roy ..................... G06Q 10/107 |
| | | | 709/206 |
| 2014/0032655 | A1 | 1/2014 | Pegg |
| 2014/0136990 | A1 | 5/2014 | Gonnen et al. |
| 2014/0143684 | A1* | 5/2014 | Oh ..................... G06F 3/04883 |
| | | | 715/752 |
| 2014/0298210 | A1 | 10/2014 | Park et al. |
| 2014/0310365 | A1 | 10/2014 | Sample et al. |
| 2014/0317502 | A1 | 10/2014 | Brown et al. |
| 2015/0012881 | A1* | 1/2015 | Song ..................... G06F 3/04842 |
| | | | 715/803 |
| 2015/0026604 | A1 | 1/2015 | Mulukuri et al. |
| 2015/0193492 | A1 | 7/2015 | Gunaratne et al. |
| 2015/0229598 | A1* | 8/2015 | Peng ..................... H04L 51/234 |
| | | | 709/206 |
| 2016/0134568 | A1 | 5/2016 | Woo et al. |
| 2016/0285799 | A1 | 9/2016 | Andreev et al. |
| 2016/0364368 | A1* | 12/2016 | Chen ..................... G06Q 10/107 |
| 2017/0024899 | A1 | 1/2017 | Hammoud et al. |
| 2017/0212877 | A1 | 7/2017 | Dukhon et al. |
| 2017/0279747 | A1 | 9/2017 | Melzer et al. |
| 2017/0329580 | A1 | 11/2017 | Jann et al. |
| 2017/0330195 | A1 | 11/2017 | Lange et al. |
| 2017/0353410 | A1 | 12/2017 | Gonzales |
| 2017/0353414 | A1 | 12/2017 | Ertmann et al. |
| 2019/0356770 | A1* | 11/2019 | Yu ..................... G06F 3/0482 |

FOREIGN PATENT DOCUMENTS

| | | |
|---|---|---|
| JP | 2014-160467 A | 9/2014 |
| JP | 2014-236874 A | 12/2014 |
| JP | 2016051525 A | 4/2016 |
| WO | 2014/045636 A1 | 3/2014 |

OTHER PUBLICATIONS

Cselle, G., et al., Buzz Track: Topic Detection and Tracking in Email, IUI'07, Jan. 28-31, 2007, Honolulu, Hawaii, 6 pgs.

Chung, J., et al., "Without the Clutter of Unimportant Words" Descriptive Keyphrases for Text Visualization, ACM Transactions on Computer-Human Interaction, 19(3), Article 19, Oct. 2012, 29 pgs.

Kim, J., ToolScape: Enhancing the Learning Experience of How-to Videos, CHI 2013 Extended Abstracts, Apr. 27,-May 2, 2013, Paris, France, pp. 2707-2712.

Fong, V., An Editable Multi-Media Authoring eBook System for Mobile Learning, ICHL 2014, 2014, LNCS 8595, pp. 184-195.

Ourhome, [retrieved May 23, 2016] 9 pgs, URL: http://ourhomeapp.com/.

WikiHow, [retrieved on May 23, 2016] 3 pgs, URL: http://www.wikihow.com/Main-Page.

Notice of Reasons for Refusal for related JP App No. 2017-088758 dated Jan. 5, 2021, 5 pgs.

The 2004 Topic Detection and Tracking {TDT2004) Task Definition and Evaluation Plan, Version 1.0, Oct. 19, 2004, 16 pgs.

Patent Mess for Location-Based Reminders for Amazon, Apple, Microsoft and Google, Nov. 22, 2011, 1 pg.

Slack Technologies, [retrieved May 17, 2016] 2 pgs, URL: https://slack.com/.

Japanese Patent Office, Notice of Reasons for Refusal, Application No. JP2021-168324, dated Oct. 19, 2022, in 3 pages.

Japanese Patent Office, Decision of Refusal, Application No. JP2021-168324, dated Apr. 17, 2023, in 3 pages.

Japanese Patent Office, Office Action, Application No. 2024-066020, dated Dec. 20, 2024, in 10 pages.

* cited by examiner

SYSTEMS AND METHODS FOR CHAT MESSAGE MANAGEMENT AND DOCUMENT GENERATION ON DEVICES

CROSS REFERENCE TO RELATED APPLICATIONS

This application is a continuation of U.S. application Ser. No. 15/285,878, filed on Oct. 5, 2016, the disclosure of which is incorporated by reference in its entirety for all purposes.

BACKGROUND

Field

The present disclosure relates generally to communication platforms and devices, and more specifically, to chat message document generation and chat message management on devices.

Related Art

In the related art, chatting and messaging applications allow people to share a wide variety of multimedia using a simple, well-understood interaction metaphor of a conversational time-line. Such related art applications can help small, task-oriented user groups to coordinate with each other in group chats, both at work and in their personal lives. However, whereas existing chat applications can provide functionality for communicating and sharing content, it can be difficult to find content generated and shared over time in a concise and helpful way. Users of the related art implementations can only find single words, but not a connected set of comments or answers to a question (which may be spread all over the chat in a traditional chat interface).

In related art implementations, it may not be possible to organize the content for future use and easy access. This may be helpful for smaller, task-oriented groups which have a common goal or project.

Further, as many of the devices implementing such chatting and messaging applications utilize displays with limited display space due to the size of the devices (e.g., smartphones, tablets, etc.), there is a need for an interface that provides such chat messages in a manner that takes such limited display space into account.

SUMMARY

Aspects of the present disclosure include a non-transitory computer readable medium, storing instructions for executing a process for managing chat messages on a mobile device. The instructions can include displaying a first message transmitted from the mobile device on a user interface; monitoring for a second message from another mobile device responsive to the first message; and on receipt of the second message from the another mobile device, generating, on the first message displaying on the user interface, a user interface indicator configured to provide the second message for display and provide a relationship interface between the first message and the second message on the user interface, the user interface indicator configured to provide the relationship interface as one of a thread and sub-thread interface, a color coded relationship, and a generation of a separate screen for messages related to the first message.

Aspects of the present disclosure include a method for managing chat messages on a mobile device. The method can include displaying a first message transmitted from the mobile device on a user interface; monitoring for a second message from another mobile device responsive to the first message; and on receipt of the second message from the another mobile device, generating, on the first message displaying on the user interface, a user interface indicator configured to provide the second message for display and provide a relationship interface between the first message and the second message on the user interface, the user interface indicator configured to provide the relationship interface as one of a thread and sub-thread interface, a color coded relationship, and a generation of a separate screen for messages related to the first message.

Aspects of the present disclosure include a mobile device, which can include a display configured to display a user interface; and a processor, configured to display a first message transmitted from the mobile device on the user interface; monitor for a second message from another mobile device responsive to the first message; and on receipt of the second message from the another mobile device, generate, on the first message displaying on the user interface, a user interface indicator configured to provide the second message for display and provide a relationship interface between the first message and the second message on the user interface, the user interface indicator configured to provide the relationship interface as one of a thread and sub-thread interface, a color coded relationship interface, and a generation of a separate screen.

Aspects of the present disclosure include a non-transitory computer readable medium, storing instructions for executing a process for managing chat messages on a mobile device, the instructions involving displaying first messages transmitted from the mobile device on a user interface; providing a first user interface indicator on the first messages of the user interface, the first user interface indicator comprising a relationship interface configured to provide second messages from one or more other mobile devices responsive to the first messages and received by the mobile device for display upon receipt of an input on the first user interface indicator, the first user interface indicator configured to provide the relationship interface as one of a thread and sub-thread interface, a color coded relationship interface, and a generation of a separate screen; and providing a second user interface indicator comprising an interface to generate a document based on the first messages and the second messages.

Aspects of the present disclosure can further include a method for managing chat messages on a mobile device, the method involving displaying first messages transmitted from the mobile device on a user interface; providing a first user interface indicator on the first messages of the user interface, the first user interface indicator comprising a relationship interface configured to provide second messages from one or more other mobile devices responsive to the first messages and received by the mobile device for display upon receipt of an input on the user interface indicator, the first user interface indicator configured to provide the relationship interface as one of a thread and sub-thread interface, a color coded relationship interface, and a generation of a separate screen; and providing a second user interface indicator comprising an interface to generate a document based on the first messages and the second messages.

Aspects of the present disclosure further include a mobile device, which can include a display configured to provide a user interface; and a processor, configured to display first messages transmitted from the mobile device on a user interface; provide a first user interface indicator on the first messages of the user interface, the first user interface indicator including a relationship interface configured to provide second messages from one or more other mobile devices responsive to the first messages and received by the mobile device for display upon receipt of an input on the first user interface indicator, the first user interface indicator configured to provide the relationship interface as one of a thread and sub-thread interface, a color coded relationship interface, and a generation of a separate screen; and provide a second user interface indicator comprising an interface to generate a document based on the first messages and the second messages.

DETAILED DESCRIPTION

Figure 1:
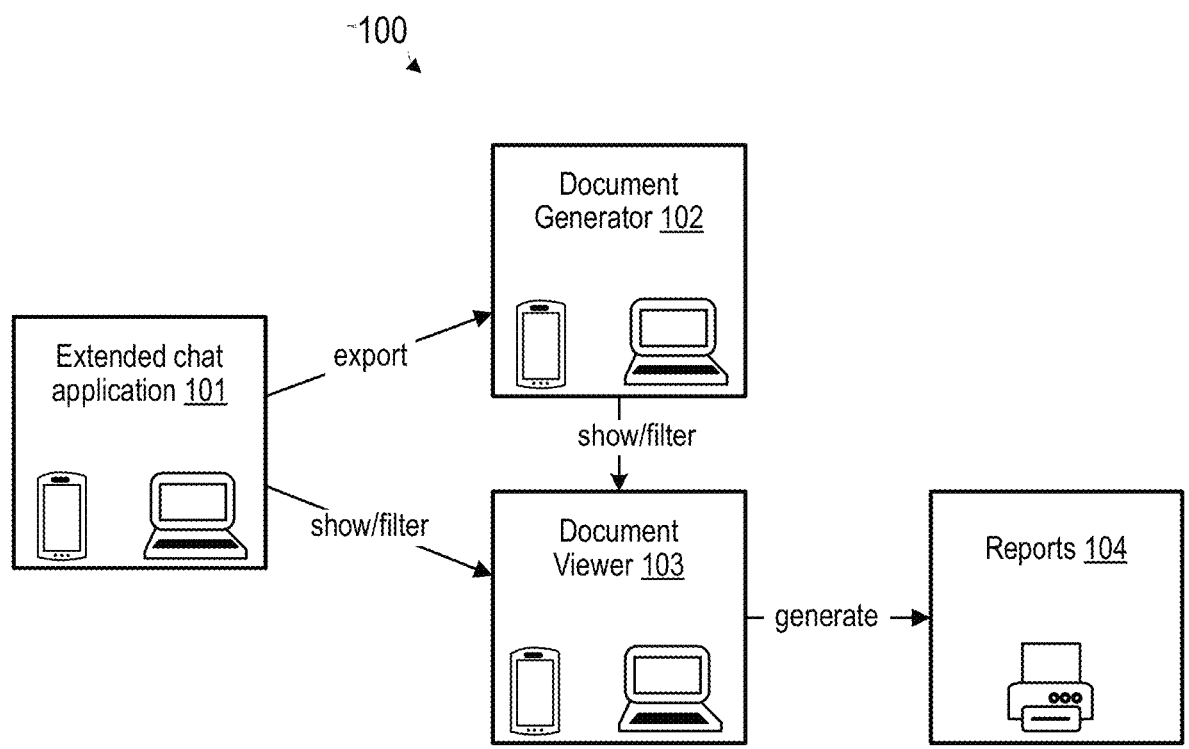
FIG. 1 illustrates an overview of a system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Example implementations described herein are directed to a chat management and document generation system for devices, such as mobile devices. In such devices, the chat messages may come in an ad-hoc manner, with no organization or relation to previous messages other than the time in which they appeared. Such an ad-hoc receipt of messages can be especially problematic for devices with limited screen space, such as mobile devices, in which a user will have to scroll through the messages repeatedly to determine the context of the messages. Example implementations provide a chat management interface that group messages by context (e.g. by topic, by group), as well as assign tasks or reminders to people associated the particular message context. Example implementations further provide a system to convert such grouped messages into documents, which can be shared among chat participants.

Examples of groups that may benefit from the example implementations described herein include, but are not limited to, caretakers of family members (or elderly persons), people who jointly take care of an animal, groups that provide help to others or coordinate a common project, or members of a distributed team. These groups can have the following traits in common: solving problems, especially when parts of the problem are repetitive tasks that may come up again in the future. There are certain issues that the group may have to deal with repeatedly. The group may have discussions about topics leading to a practicable solution for the future. Task lists that have to be completed by the group, as well as deadlines that are visible to the group, may also help in reaching a common goal. Communications may be about different topics and can happen asynchronously because not all group members may be available at the same time. Therefore, example implementations can facilitate the extraction of the generated knowledge for future use.

The related art implementations fail to provide an interface of a messaging application with a knowledge extraction system that can create multimedia documents and allow users to store and edit content for future use as how-to instructions, Frequently Asked Questions (FAQs), or summary reports.

In example implementations, there is an extended chat interface that allows structuring the chat to provide an overview of topics and questions that can be marked for priority. These elements appear highlighted in the chat and as a starting point on the start screen. In example implementations, there is also the creation of how-to instructions, FAQ and reports based on of knowledge accumulated in a chat. This can be user-guided, semi-automated, or automated. Existing related art implementations do not allow to structure chats. Further, the ability to transform contents from the chat in a readable document format is not provided in the related art.

FIG. 1 illustrates an overview of a system, in accordance with an example implementation. The system 100 can include an extended chat application 101, the document generator 102, and the document viewer 103. The extended chat application 101 is configured with features that can be helpful for small, task-oriented groups and can be made available for mobile devices and desktop computers. The document generator 102 allows the creation of multimedia documents such as How-to instructions, FAQs, or reports. The Document Viewer 103 is used to filter, view, and play the documents that may also be generated as printable reports 104.

Figure 2A:
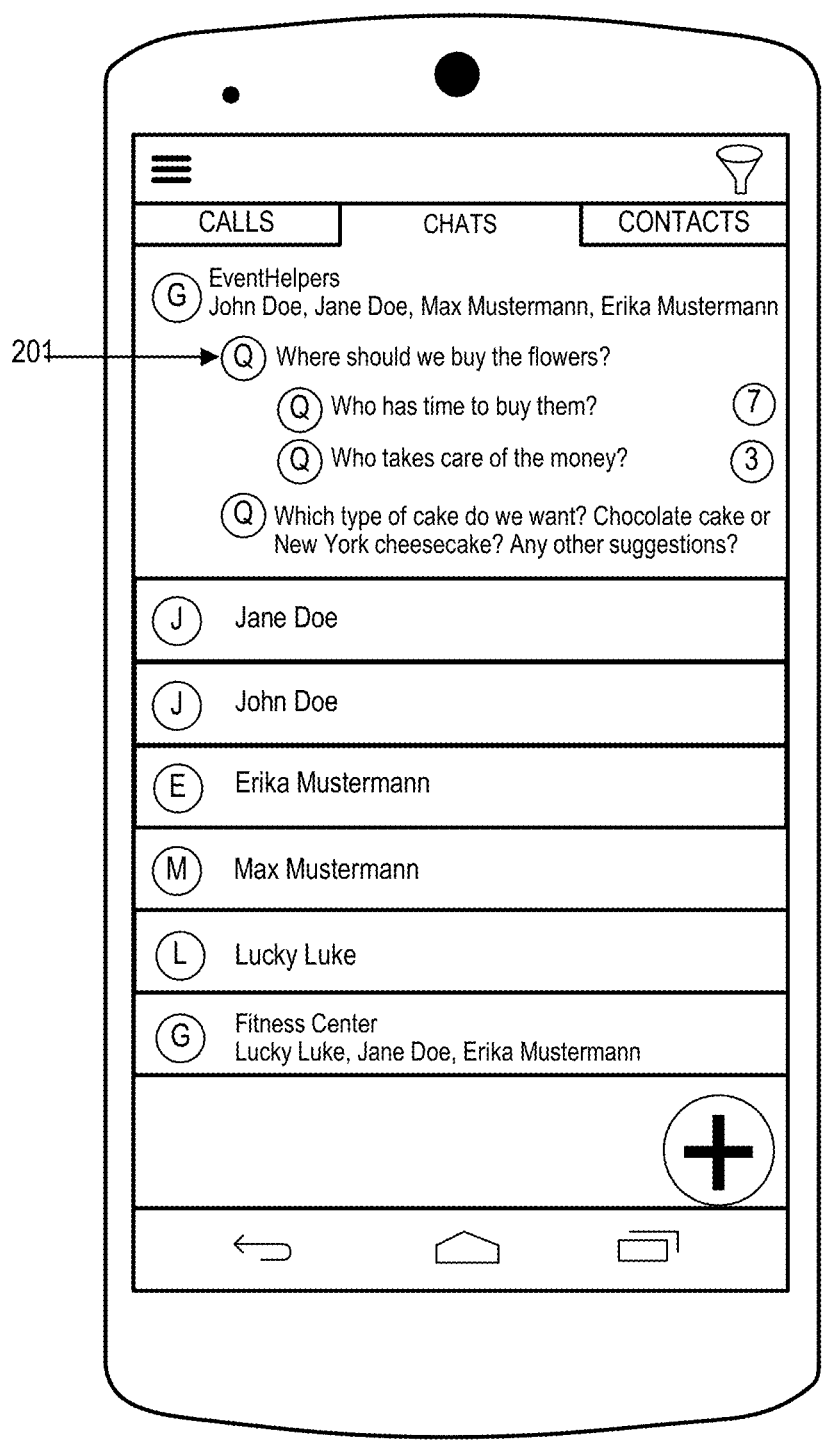
FIGS. 2(a) to 2(e) illustrate an extended chat application, in accordance with an example implementation.

FIG. 2(a) illustrates an extended chat application, in accordance with an example implementation. Related art chat applications can include the following features: send text, images, videos, and audio messages, edit images and videos, send animated gifs and emoticons, send contact cards, and communicate with groups. In example implementations of the extended chat application, additional elements are provided designed for small, task-oriented groups. Such elements can be created in the chat view during a conversation. Depending on the chat entry, a dialog may open, where the user can input additional information (e.g., due-dates, selected group members, or durations for validity). The created element is then marked in the chat and/or shown on the extended start/overview screen of the application as illustrated in FIG. 2, which not only shows the groups and past chats, but also unanswered questions and other elements that may require an action, as well as indicators for newly added elements or messages in chats as follows:

Sub-Threads: In an example implementation of sub-threads, questions or discussions can be highlighted in the chat and appear on the start page of the application until they are marked as finished (see FIG. 2(a), for example "Where should we buy the flowers?" at 201). Example implementations can also start a thread-like structure of elements, breaking up the strictly timeline-based view of the chat. Further, sub-threads may also include other sub-threads depending on the desired implementation. For example, sub-threads may branch into other sub-threads based on the groups participating in the discussion. Threads/sub-threads may have sub-threads, thereby facilitating a thread chain of any depth depending on the desired implementation.

Notes: In an example implementation of notes, the notes can be highlighted in the chat and marked by the recipient to hide the note from the start page. Such notes can follow the "sticky note" metaphor and stay on the start screen of the application until they are dismissed. In contrast, other discussion elements that are not "sticky" can be placed appropriately in the timeline, and can be displaced off the screen as new messages are added.

To-Dos/Tasks: In example implementations, tasks can be highlighted in the chat and appear in a to-do list in an additional tab in the application. Tasks can be marked as done by at least one of the assigned group members, may have a deadline, and may require feedback (e.g., a photo of the result), depending on the desired implementation.

Message to future: In example implementations, messages can be scheduled to be sent at a future time and be delivered only at the specified future time.

Time-based reminder: In example implementations, the time-based reminder can be created like a regular message but is assigned a reminder date/time by the sender. The reminder can be configured to appear (e.g. immediately) in the time-line list of messages of the recipients, but can also be configured to reappear as the most recent message to its recipients at a certain date/time.

Location-based reminder: In example implementations for location-based reminders, the sender sets a reminder location instead of a date/time for the message to reappear. For example, when a message is transmitted with a location based reminder, the message may be held in queue at the receiving device until the receiving device is at the specified location. In other example implementations, the message may be transmitted once the receiving device indicates that it is at the specified location. Other implementations may also be utilized depending on the desired implementation.

Time and location based reminder: In example implementations, the time and location reminder can be combined so that the sender also sets a reminder location in addition to a date/time for the message to reappear.

Group calendar: In example implementations, a group calendar gives an overview of personal and group activities. The group calendar may be synchronized with other calendars. Events and appointments can be sent from the chat directly to the calendar.

Mark messages: In example implementations, messages that were posted to the chat timeline can be marked as important or "liked".

Search: In example implementations, an interface is provided to facilitate search for a particular word or for images, audio, and/or video in a chat. Media search requires advanced search methods like search by date, search by media type, and so on.

Each of the features described above can be sent to a set of group members:

Whole group: All group members receive the element.

Part of the group: A defined subset of group members receives the element.

Single member: Only a single group member receives the element.

The addition of sub-threads as questions that initialize a new discussion in a subsection of the chat is a concept that is absent in related art chat applications. Through the use of sub-threads, incoming chat messages can be organized as received, thereby conserving space on the screen through associating messages with their corresponding thread instead of displaying the messages when received as in the related art implementations.

In example implementations, sub-threads can be created for several reasons. For example, sub-threads facilitate the keeping of information about a topic together in a chat, and ensure that questions are answered.

Group members may want to discuss a topic and initiate a discussion. Although related art applications may facilitate the initiation of a discussion in a chat view, messages relevant to one topic or discussion may get mixed up with messages from other discussions or chat topics over time. Creating a sub-thread allows the group to focus on one topic without having to reference or cite previous answers that might be mixed into other topics and discussions from this group.

Further, one of the problems with questions and answers in group chats is that responses to questions can be separated from the original question and mixed in with messages from other topics. For example, if a user has a question during a chat conversation, the person who can answer the question may not be online, and the conversation in the chat continues and the question may move out of focus until a certain person goes online again. A user may also ask multiple questions in consecutive messages while the other user are not answering immediately. One or more users in the group may start answering one of the questions and forget about the other questions because they have moved out of focus. Creating a sub-thread for a question ensures that the question is not forgotten, because it is marked in the chat and shown and indicated as new on the home screen (which is the entry point when a user opens the application).

Figure 2B:
Figure 2C:
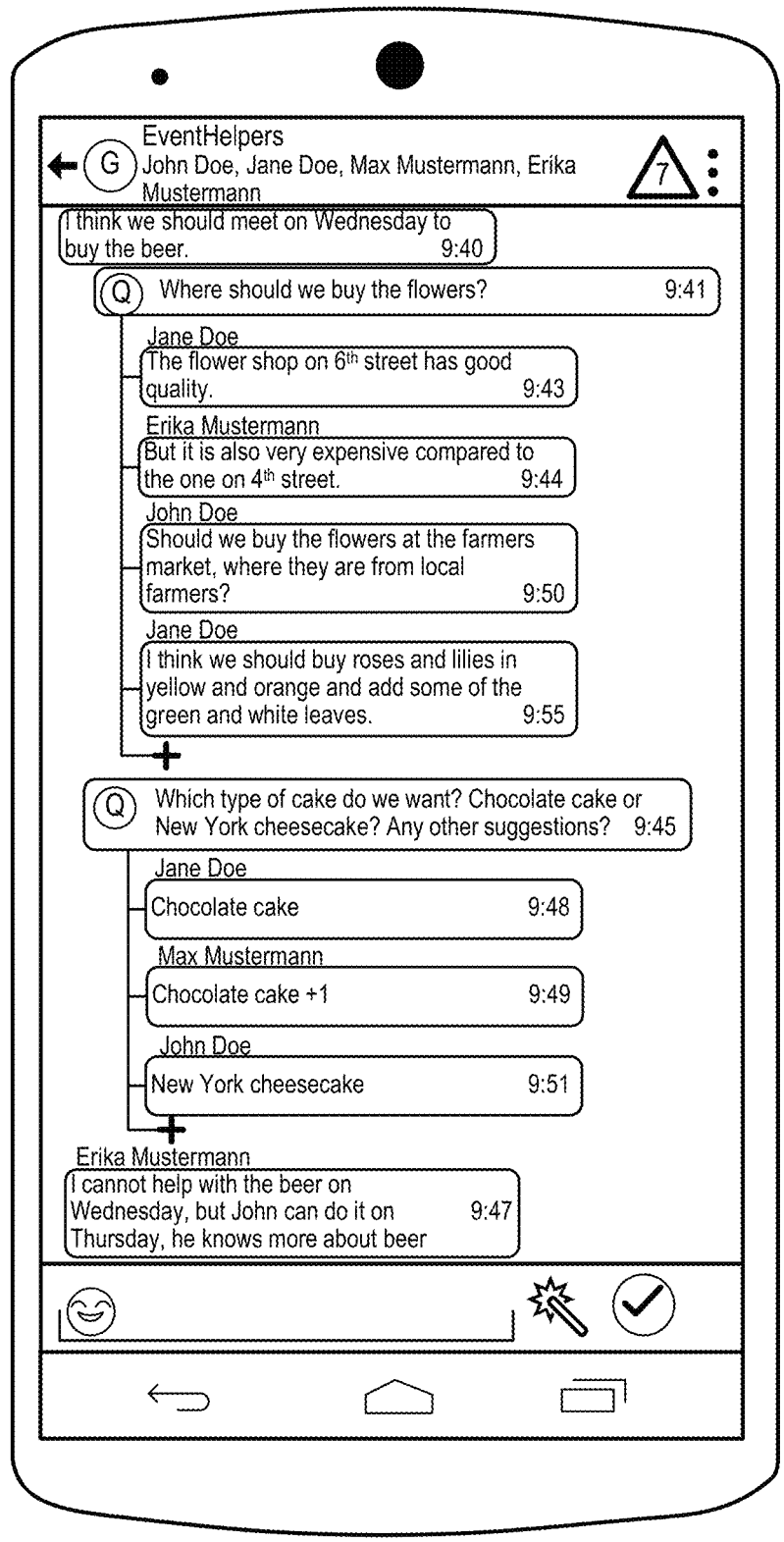
Figure 2D:
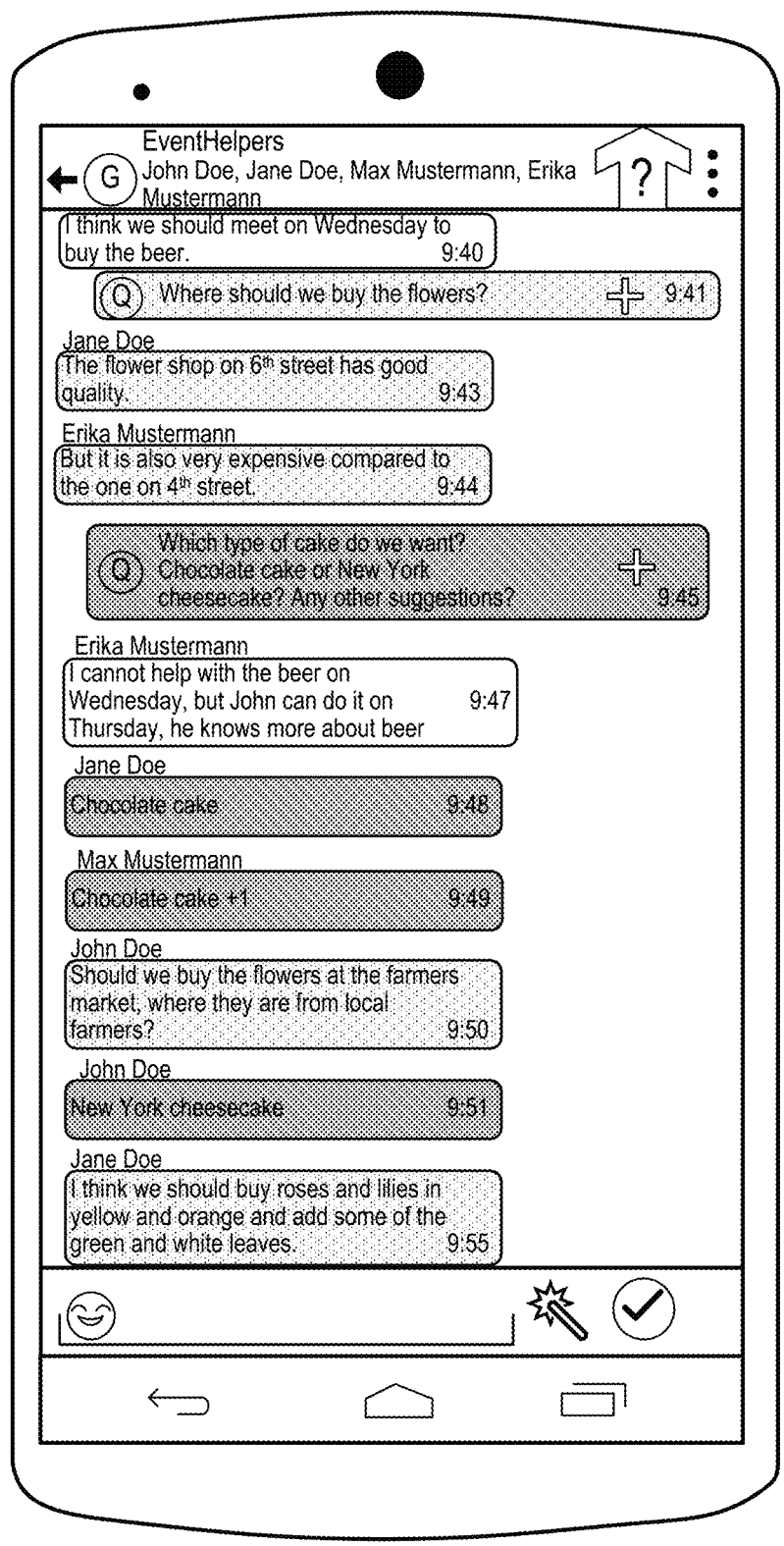
Figure 2E:
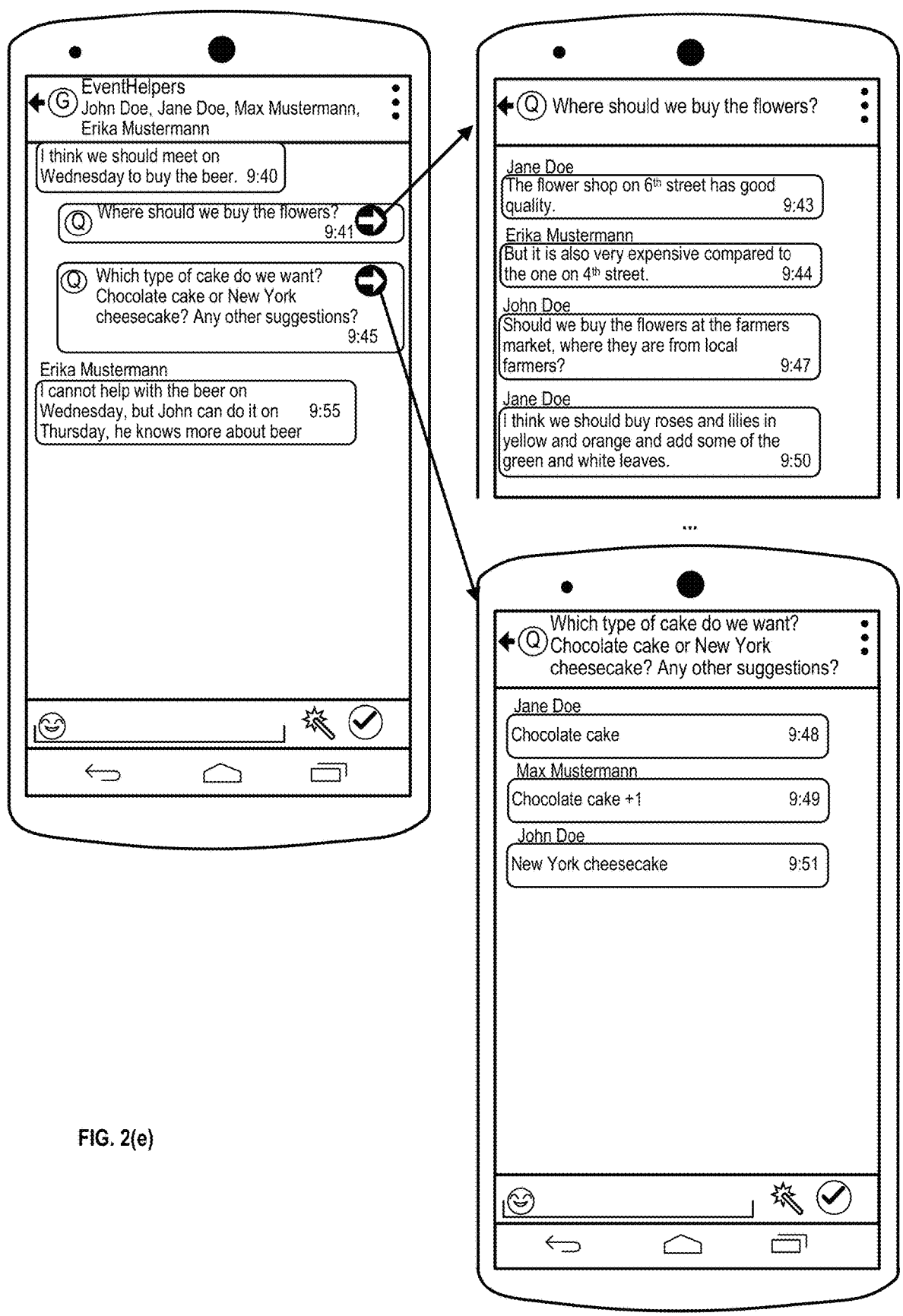

FIG. 2(b) illustrates a chat application in accordance with an example implementation. Specifically, FIG. 2(b) illustrates an example of special element creation. In example implementations, sub-threads may be created during message creation. Sub-threads can be created either while a new message is created, or by promoting an already posted message. If the user types in a message (or posts a file) before sending, the message can be marked as a special element (e.g., a sub-thread) on the element marking screen 210 as illustrated in FIG. 2(b). It is also possible to create a special element and write the text in the sub-thread.

In example implementations, an already posted message can be promoted without the utilization of follow-up messages. For example, a user in the chat (e.g., not necessarily the author of the entry) can conduct an action (e.g., gesture of long-press on touch screen) on an element in the chat. A menu opens the element marking screen 210 as illustrated in FIG. 2(b), where the entry can be marked as special element.

In example implementations, an already posted message may be promoted through the manual selection of follow-up messages. In an example implementation, a user in the chat (e.g., not necessarily the author of the entry) can conduct an action (e.g., gesture of long-press on touch screen) an element in the chat. A menu opens the element marking screen 210 as illustrated in FIG. 2(b), where the entry can be marked as special element. The user is then forwarded to the next screen, where the user can select already existing entries that should be part of the new sub-thread.

In example implementations, an already posted message can be promoted with a semi-automated selection of follow up messages. In an example implementation, a user in the chat (e.g., not necessarily the author of the entry) can conduct an action (e.g., gesture of long-press on touch screen) an element in the chat. A menu opens the element marking screen 210 as illustrated in FIG. 2(*b*), where the entry can be marked as special element. The user is then forwarded to the next screen, where the user can correct preselected entries that should be part of the new sub-thread.

Sub-threads can be viewed in various different ways, such as in a thread and sub-thread interface, a colored view, or a split view with two screens. Using the chat application, the viewer can switch between the different views. The views may be different representations of the same information.

In an example implementation involving a thread and sub-thread interface as shown in FIG. 2(*c*), the thread and sub-thread interface breaks up the strictly timeline-based paradigm of a chat and shows the sub-thread in the chat window. Answers or replies to a sub-thread can be added by selecting the "+" at the end of the sub-thread which facilitates the addition of entries at the end of the sub-thread and not at the end of the chat. Using this paradigm, new messages do not necessarily appear at the end of the chat where they are marked as unread from a certain point in time. Messages may be spread throughout the threads in the chat. Such an implementation may further utilize a hint for the user that new entries may be somewhere in the chat. An example of such a hint can include a warning sign (e.g. a button that catches the attention of the user) in the top bar that shows how many new entries are in the chat, and can also function as a button that the user can use to jump through the chat from one new entry to another. An example implementation of a thread and sub-thread interface is illustrated in FIG. 2(*c*). The overview screen of FIG. 2(*a*) shows the number of new entries for a question next to the question. In an example implementation, selecting the question jumps to the last unread message of the sub-thread in the chat.

In an example, the colored view keeps the timeline-based paradigm of the chat and marks entries that belong to different sub-threads in different colors. Answers or replies to a sub-thread can be added by clicking the "+" next to the question to add entries that are marked in the same color as the question. Using this paradigm, new messages appear at the end of the chat where they are marked as unread from a certain point in time. However, the questions may be spread somewhere in the chat. For this reason, example implementations may also involve a button that allows the user to jump through the chat from one question to another. In example implementations, it is also possible to use a gesture (e.g. long-press) on the last reply in the sub-thread and mark the new entry as part of one of the sub-threads, as illustrated in FIG. 2(*d*). As shown in FIG. 2(*d*), related messages are color coded, so that upon an input on the plus symbol or other desired user interface indicator, the device can traverse the messages having the same color and display or highlight the next message having the same color based on timestamp. The overview screen shows the number of new entries for a question next to the question. Selecting the question jumps into the first unread answer to the question in the chat.

In an example implementation of a two screen view, the view can be implemented similarly to the thread and sub-thread interface, with the addition that the two screen view keeps the timeline-based paradigm of the chat by marking the start of a sub-thread with an icon. Answers or replies to a sub-thread can be read by tapping on the sub-thread which brings the user to a new screen showing just that sub-thread and its follow up messages. Using this paradigm, new follow up messages for this sub-thread can be entered as usual messages in the sub-screen without selecting a special button first, but instead, the user can just type in the text input at the bottom of the screen, as illustrated in FIG. 2(*e*). The overview screen shows the number of new entries for a question next to the question. Selecting the question jumps into the view of the sub-thread. As illustrated in FIG. 2(*e*), a separate screen is generated for presenting a sub-thread to a thread. Further, the same interface can be provided within the separate screen, thereby facilitate the implementation of sub-threads within sub-threads, and the generation of separate screens for sub-threads within sub-threads, in accordance with the desired implementation.

In example implementations, there is a document generator that may be added to the chat application. The newly introduced features as described above add an additional level of annotations to the previously linear chat. Different ways of marking elements provide hints on their importance. However, with longer chats, information may be hard to find after a time. Here, it can be helpful to not only mark elements but also extract a semantically connected set of elements containing knowledge from the chat and transform it into a more readable form such as a How-to instruction, an FAQ, or a report. Elements are selected based on user selections or they can be pre-selected by their annotation (e.g., type of element, stars/markers given by users over time) depending on the document that will be created. In the following, example implementations facilitate the creation of multimedia documents from the chat application.

In an example implementation, the multimedia document can be user guided. In the user-guided creation, the interface facilitates an author to perform several steps. First, chat elements are selected through the interface. This process starts with the user clicking one chat entry, and then a selection tool provides a list of the following elements in the chat application. After that, the user can choose for each element, if it should be added to the document. Then, selected elements are copied to the editor area where they can be rearranged, edited, and merged with the previous or following elements. New elements can be added from a local file system or the internet if desired, and formatting can be applied. In the end, the document can be exported into the desired format.

In an example implementation, the multimedia document can be generated in a semi-automated process. In the semi-automated creation, several algorithms are applied after the user selects from where in the chat to start the selection. Basic text analysis as well as the analysis of annotations (e.g., likes, markers) suggest relevant entries, which may then be altered by the user. During the copy process, unnecessary parts of the texts (e.g., emoticons, unnecessary spaces) are removed and elements a user posted as consecutive smaller messages are merged to one text. The resulting list of elements can then be edited as described for the user-guided process. Here, the user is supported by retrieval and search algorithms that provide video scenes, images, or other materials from the internet.

In an example implementation, the multimedia document can be generated in an automated process. The automated creation can also be configured to learn from the User-guided and semi-automated modes and automatically export the desired document format using learning algorithms, such as machine learning algorithms.

In addition to the linear multimedia documents, a hypermedia graph can be created using the document creation interface. The hypermedia graph requires a graph-view and editors for logic statements that are applied at forks in the graph. Such example implementations allow creating hypermedia documents especially on mobile devices which can provide different levels of detail, difficulty, or instructions for different user groups. The mobile interface provides an overview of the document and provides interactive elements in an existing document, where the document can be extended to make the hypermedia creation possible on mobile devices. More detailed information can be added as well as different types of media elements to provide more information by recording the information into the app.

The more complex sub-processes during document generation are the selection of the following entries, text cleaning, and reordering of entries. These components can build on related art implementations in topic detection and tracking to derive an initial topic clustering of the chat messages and in turn to track detected topics. Such approaches have been applied to news streams and also email organization. Techniques such as keyphrase extraction and analysis of conversational dynamics can also be used to filter less important posts and help structure the generated document.

In example implementations, the multimedia document viewer provides features to display all types of media as well as elements for navigation. The viewer adapts to the playback device and the characteristics of the user by filtering the hypermedia graph. Depending on the playback device, the amount of data can be adjusted as well as the sizes of the media elements. In example implementations, slower connections may focus on text and images, while videos are shown using higher bandwidths (in case different types of media are available). Further, a report generator can be provided with a filter feature which adapts the resulting document according to user input and purpose.

Furthermore, functions are available that allow users to extend the currently viewed document if information seems to be missing or presented in an unintended way, enabling passive viewers to become collaborating authors. Such functions can be conducted in different modes.

In an example implementation of an uncontrolled mode, content can be edited by the users without any approval process.

In an example implementation of an author controlled mode, when a user adds/edits content, a notification is sent to the author of the multimedia/hypermedia document. In case the author agrees, the author can accept the changes. If the author does not agree, the content can be rejected, or a discussion can be started.

In an example implementation of a user-controlled mode, when a user adds/edits content, the new content is marked as unverified. Other users can then peer review the content, change the content, and vote if the content can be accepted as "regular" content to the document. This can ensure a good quality of new information and a constant improvement of the document.

Figure 3:
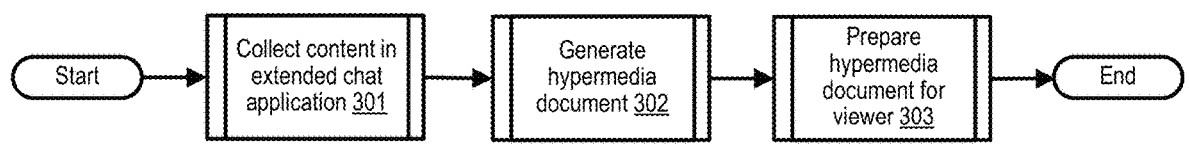
FIG. 3 illustrates an overall flow diagram, in accordance with an example implementation.

FIG. 3 illustrates an overall flow diagram, in accordance with an example implementation. In example implementations, the system can be segmented in three sub-processes (content collection, hypermedia document generation, and hypermedia preparation) which can be explained in more detail hereafter as illustrated in FIG. 3.

At 301, the system is configured to collect content from the extended chat application as described in FIGS. 2(a) to 2(e). Such content can include text, images, video, audio, or files as posted through the chat application. At 302, after the content is collected, a hypermedia document can be generated from the content. At 303, the hypermedia document is provided in a viewing interface for the user. Further details of the flow are provided in FIG. 4.

Figure 4:
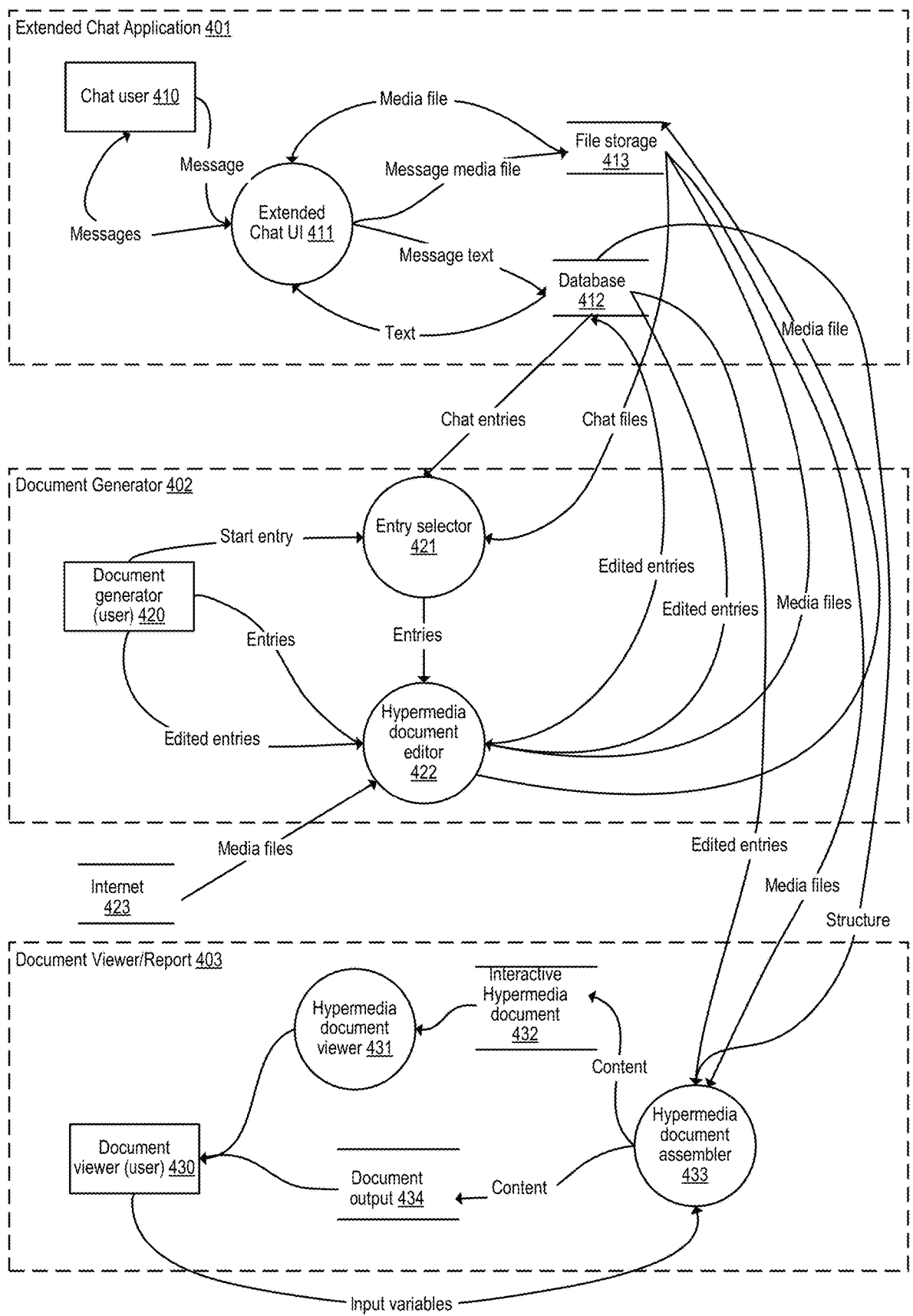
FIG. 4 illustrates a data flow, in accordance with an example implementation.

FIG. 4 illustrates a data flow, in accordance with an example implementation. Specifically, FIG. 4 illustrates the data flow between the extended chat application 401, the document generator 402, and the document viewer/report 403. In the extended chat application 401, a user sends a message at 410, which is sent to the extended chat UI at 411. If the message is only text, the text is added to the database, and the connections to and from the entry are updated at 412. If the message is a media file, the media file is stored on the server at 413 and the link is added to the database, then the connections to and from the entry are updated. The chat is then updated for all users.

In the document generator 402, the user who creates the document at 420 opens the entry selector at 421, selects the start entry and is then guided to the hypermedia document editor at 422. At the hypermedia document editor, an interface is provided so that the content can be edited and content from the internet can be added as shown at 423. The content is linked together to a hypermedia document. As for the chat, the media files are stored on the file server, text and structure are stored in the database. The user may select a document, add further input, then an interactive hypermedia document is created and shown in the viewer or the contents are exported as a document file (e.g., PDF, DOC).

In the document viewer 403, the user who views the document at 430 opens the hypermedia document viewer 431 which displays an interactive hypermedia document at 432. The interactive hypermedia document 432 is created by the hypermedia document assembler 433, which is also configured to generate the document file at 434 for the user after the user instructs the hypermedia document viewer 431 to construct the document.

Figure 5:
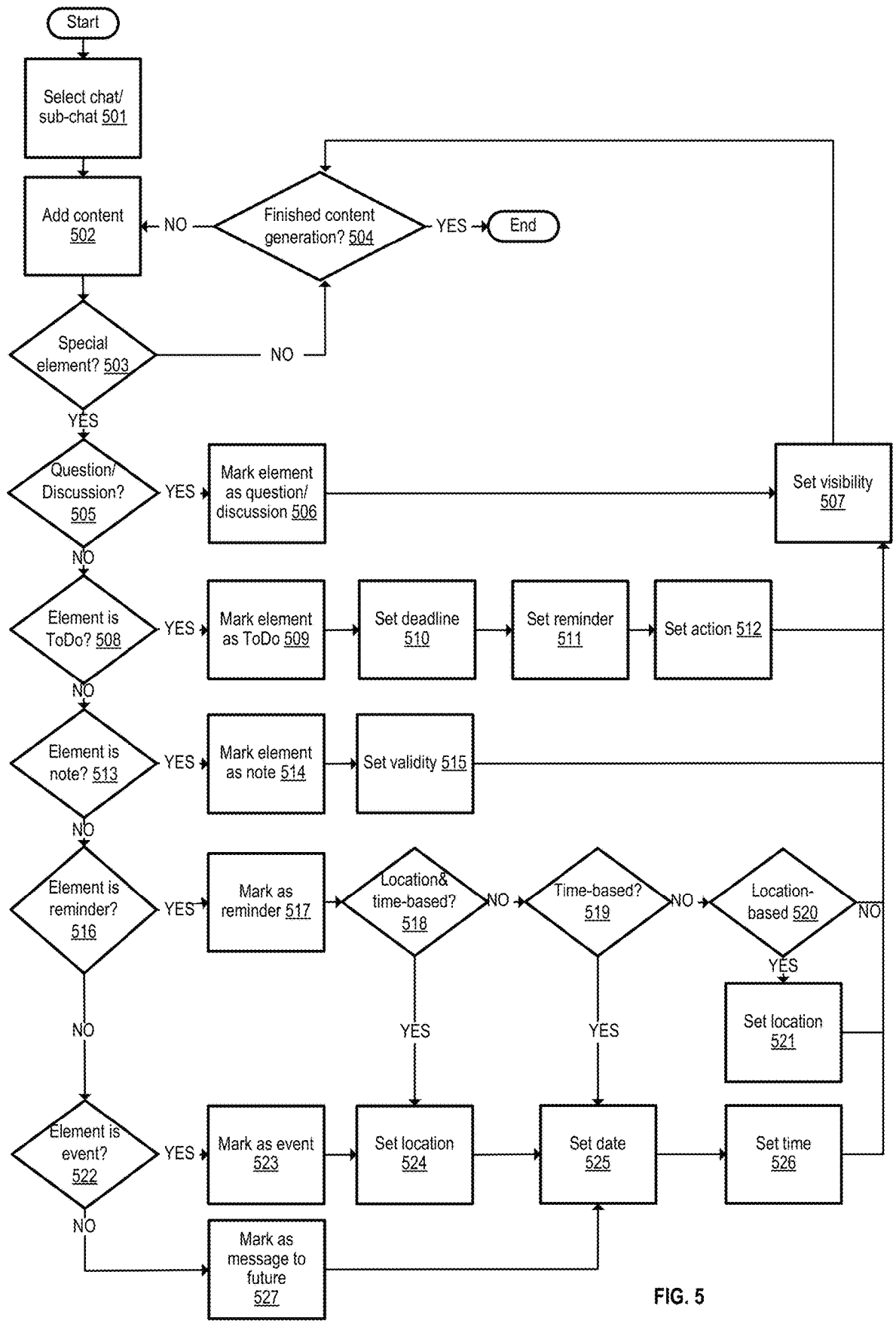
FIG. 5 illustrates the flow for content collection, in accordance with an example implementation.

FIG. 5 illustrates the flow for content collection, in accordance with an example implementation. Specifically, FIG. 5 illustrates the processes during content collection (e.g. chat application). At 501, a selection of a chat/sub-chat is received on the interface through the user. At 502, the system proceeds with the addition of content. During this flow, the system may receive a typed text or media through the extended chat application. At 503, elements may be marked as illustrated in the interface of FIG. 2(b). As illustrated in FIG. 2(b) elements can be marked as question/discussion, ToDo, note, reminder, event, message to future, and so on. If no special element is marked (No), then the flow proceeds to 504, to determine if content generation is finished. If so (Yes), then the flow ends, otherwise (No), the flow proceeds to 502 to process the addition of content.

At 505, a check is performed to determine if the marked element is a question or an indication of a start of a discussion. If so (Yes), then the flow proceeds to 506 to mark the element as a question or as a start of a discussion, and then proceeds to 507 to set the visibility. At 507, an interface can be provided to facilitate the setting of the visibility of the special element. In an example implementation, there can be three visibility settings: single user, part of group or whole group. If the single user or part of group is selected, the according subset of the group is selected.

Otherwise (No), the flow proceeds to 508, a check is performed to determine if the special element is a ToDo element. If so (Yes), then the flow proceeds to 509 to mark the element as a ToDo element. The flow then proceeds to 510 to set a deadline, wherein an interface is provided to facilitate the selection of a date and time until the element is valid or has to be finished. The interface provided can also include an interface to facilitate the setting of a reminder at 511, wherein the interface facilitates a selection of when a reminder should be set and what time before the deadline the reminder should open in the chat application. Further, the interface can also facilitate the setting of an action at 512, which can be a requirement for taking a picture, answering a question, writing down values, taking a video or some other sort of documentation from the recipient, in accordance with the desired implementation.

Otherwise (No), the flow proceeds to 513, wherein a check is performed to determine if the special element is a note element. If so (Yes), then the flow proceeds to 514, wherein the element is marked as a note. The flow then proceeds to 515 to set the validity through an interface, wherein an interface can be provided to facilitate the selection of a time-span that indicates how long the element is valid and shown to other users.

Otherwise (No), the flow proceeds to 516, wherein a check is performed to determine if the special element is directed to a reminder. If so (Yes), then the flow proceeds to 517 where the element is marked as a reminder. The flow then proceeds to 518 to determine the type of reminder. If the reminder is a location and time based reminder (Yes), then the flow proceeds to 524 to set the location and other information of the reminder through the interface. In example implementations, a location can be entered either by typing in the address or by marking the location on a map.

If not (No), then the flow proceeds to 519, to determine if the special element is a time based reminder. If so (Yes), then the flow proceeds to 525 to provide an interface for setting a start date and to 526 to set the time for the element. Otherwise (No), the flow proceeds to 520 to determine if the special element is a location based reminder. If so (Yes), then the flow proceeds to 521 to set the location in a manner similar to the flow at 524. Otherwise (No), the flow proceeds to 507 to set the visibility.

If the special element is not a reminder (No), then the flow proceeds to 522, wherein a determination is made as to whether the element is directed to an event. If so (Yes), then the flow proceeds to 523 to mark the element as an event. The flow then proceeds to 524 to determine the location of the event, and proceeds to obtain other information in accordance with the desired implementation.

If the special element is not an event (No), then the flow proceeds to 527 to mark the element as a message to future, and then proceeds to 525 to set the date and to 526 to set the time.

Figure 6:
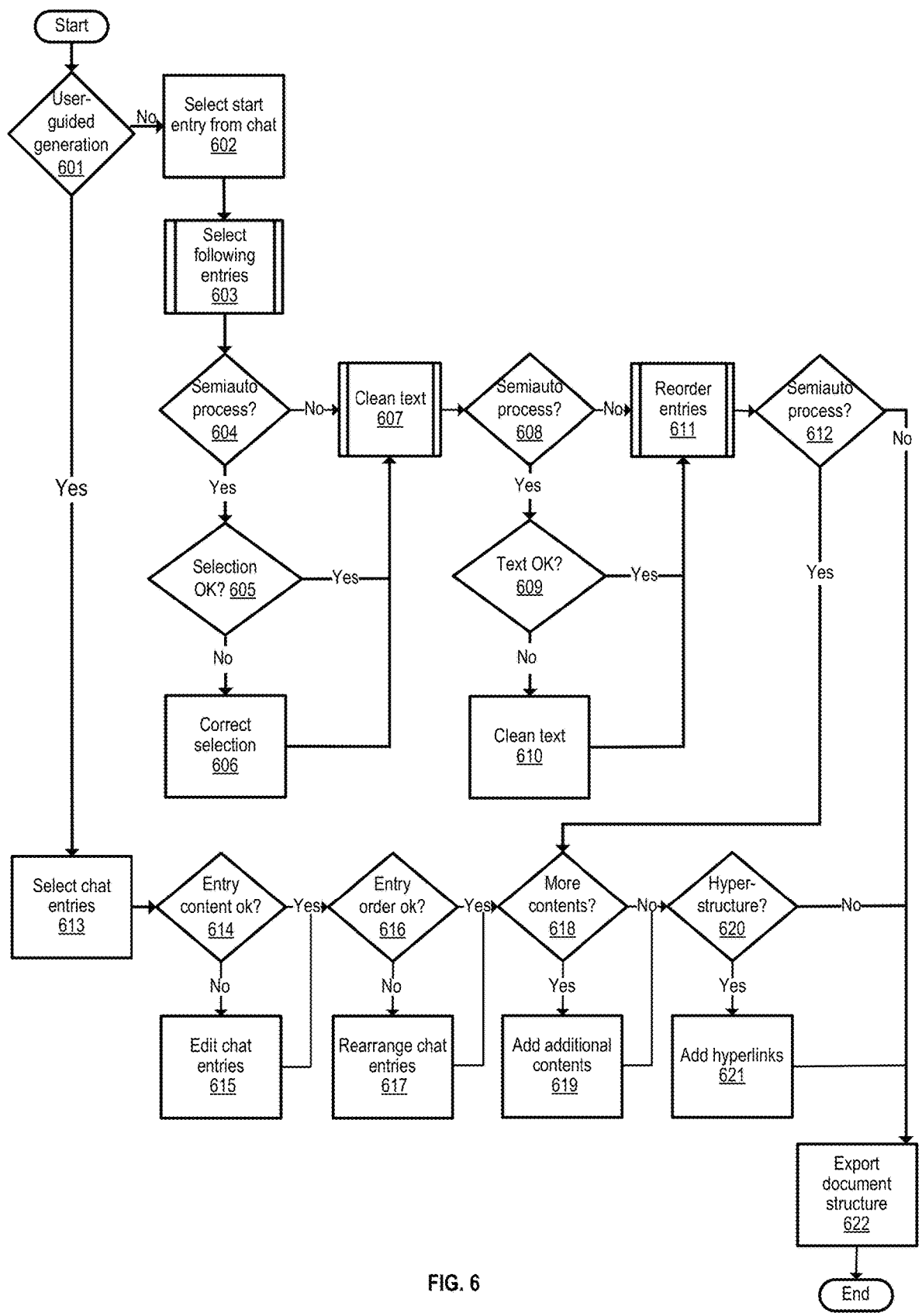
FIG. 6 illustrates a flow diagram for document generation, in accordance with an example implementation.

In another example implementation, once the content in the extended chat application is collected as shown at 301 in FIG. 3, a hypermedia document can be generated at 302, and then provided to a document viewer at 303. FIG. 6 illustrates a flow diagram for document generation, in accordance with an example implementation. At 601, a determination is made as to whether the document generation is to be a user-guided generation process (e.g. manual), or a semi-automatic process.

In the user-guided document generation process (Yes), an interface is provided to facilitate the selection of chat entries at 613. The entries are selected by marking each of them through the interface. At 614, a user confirmation or interface can be provided to determine whether the content of the entries are acceptable. If not (No), then the flow proceeds to 615, wherein an interface is provided to facilitate the editing of chat entries. In such an interface, entries can be altered, for example to remove typos, emojis and unwanted text. Text can also be added or removed.

At 616, a user confirmation or interface can be provided to determine if the order of entries is acceptable. If not (No), then the flow proceeds to 617, wherein an interface is provided to facilitate the rearrangement of the order of chat entries, in accordance with the desired document. In example implementations, there may be situations wherein the order of the entries might be wrong due to the timeline of the chat. Single entries can be reordered if necessary.

At 618, a user confirmation or interface can be provided to determine if additional content is to be added. If so (Yes), then the flow proceeds to 619, wherein an interface is provided to add additional contents. In case information is missing, or the author knows better illustrations than the ones collected during the chat, external information can be added in accordance with the desired implementation.

At 620, a user confirmation or interface can be provided to determine if hyper-structures are to be added. If so (Yes), then the flow proceeds to 621, wherein hyperlinks can be added. In example implementations, a hyper structure can be added to provide different versions of the content or different path through the document.

If the document generation is through the semi-automated process (No), then the flow proceeds to 602, wherein an interface is provided to facilitate the selection of the starting entry from the chat. In the automated or semi-automated mode, one start entry is selected, whereupon the content generation starts through the selection of following entries to the starting entry at 603.

At 604, 608 and 612, a previously set determination is checked as to whether the semi-automated generation process is desired. If so (Yes), several interfaces may be provided, which can include the following.

An interface for selection correction can be provided at 605 wherein results from the automated selection at 603 can be corrected in the same interface as used for the user-guided mode. If the selection is okay (yes), then the flow proceeds to 607 to clean the text in an automated manner as described, for example, at 615. Otherwise (No), the flow proceeds to 606 to correct the entry selection according to the direction provided by the user through the interface.

An interface for text correction can be provided at 609, wherein results from the automated text cleaning can be corrected in the same interface as used for the user-guided mode. If the text is okay (Yes), then the flow can proceed to 611 to re-order the entries in an automated manner as described, for example, at 617. Otherwise (No), a process to clean the text is provided as described in 610.

At 622, the document structure is then exported to database 412 and file storage 413 from where it is fetched by the document viewer. Once the automated generation is finished or the user has ended the user-guided or semi-automated generation, the document structure as well as the contents of the document are exported to the viewer.

Figure 7A:
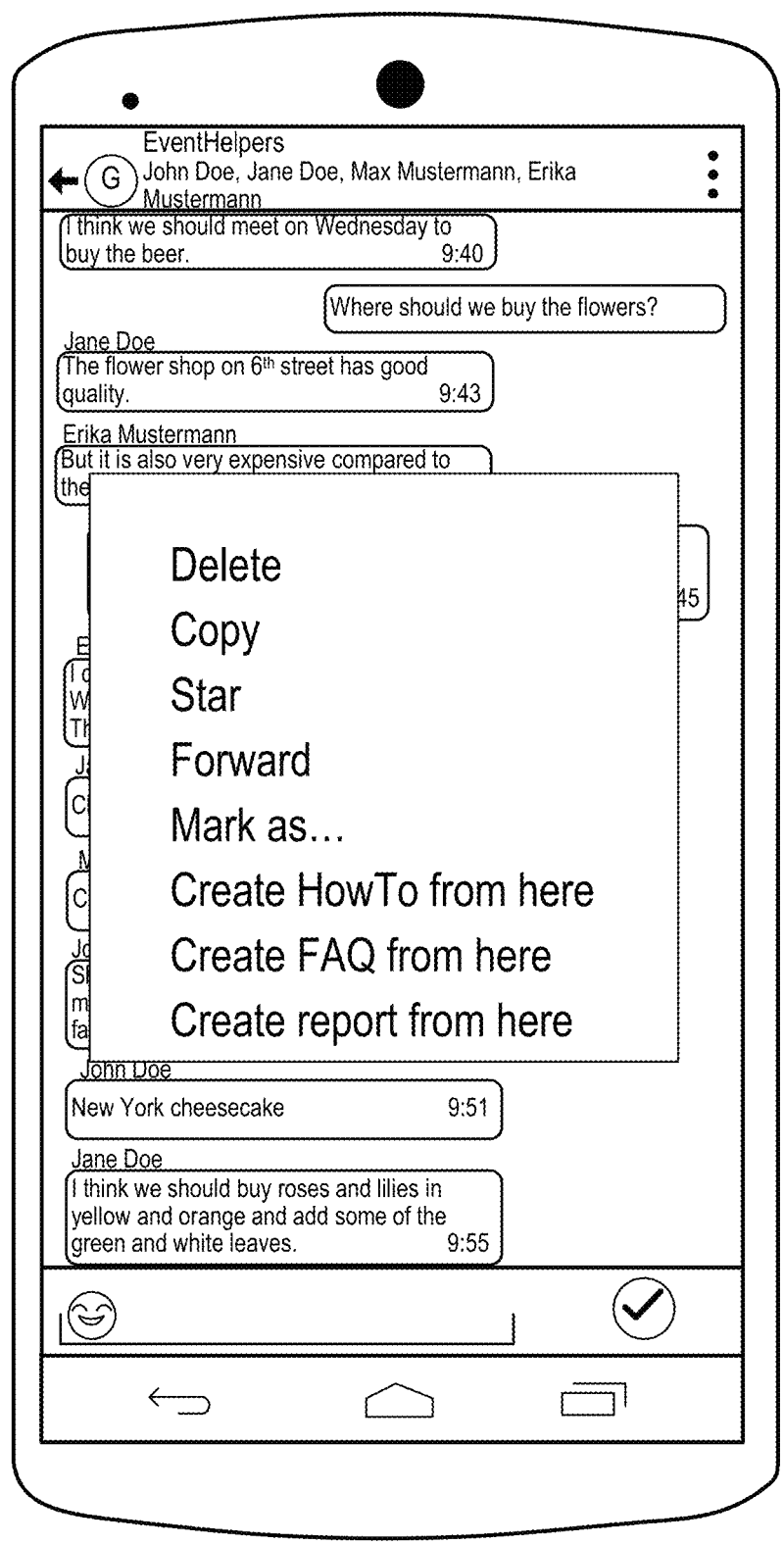
FIGS. 7(a) to 7(c) illustrate an example document generation interface for a chat application, in accordance with an example implementation.
Figure 7B:
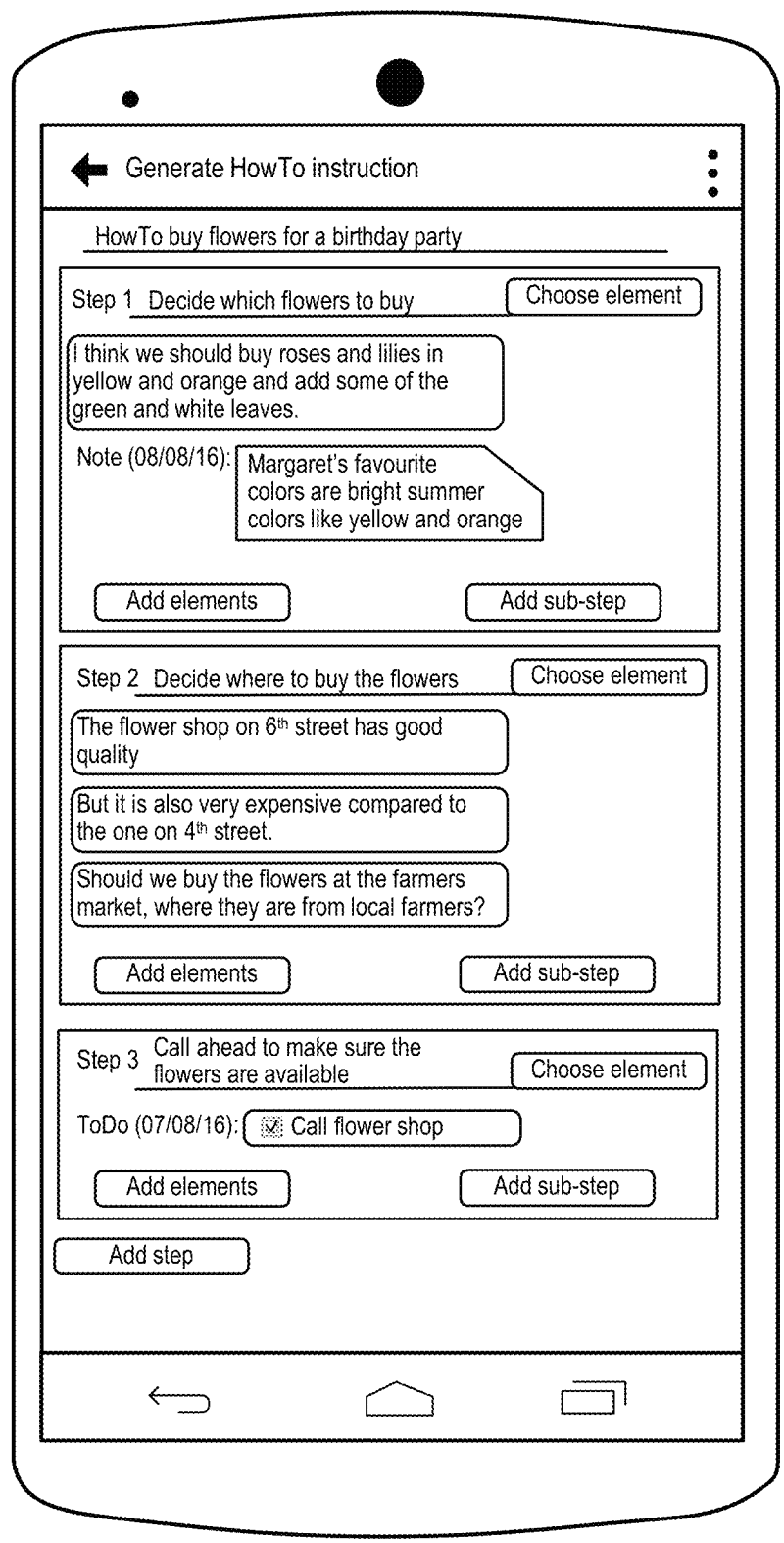
Figure 7C:
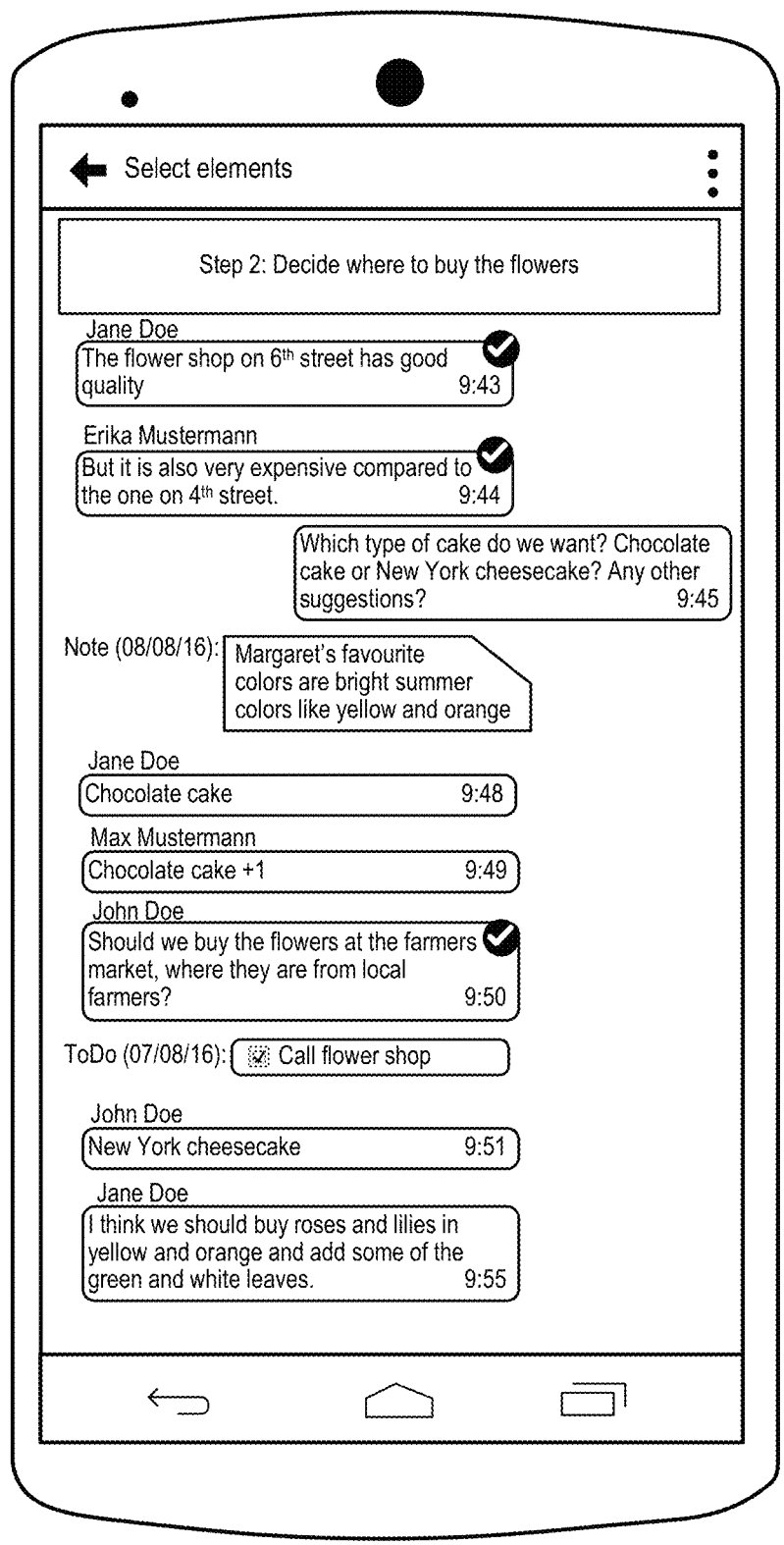

FIGS. 7(*a*) to 7(*c*) illustrate an example document generation interface for a chat application, in accordance with an example implementation. The interface for the user-guided process provides screens which allow the user to first define the type of document (e.g., How-To, FAQ, Report, etc) that the user wishes to create, as illustrated in FIG. 7(*a*). Then, depending on the document, structuring elements can be provided in a template, in accordance with a desired implementation. For example, step and sub-step elements are part of a template for a How-To instruction as illustrated in FIG. 7(*b*), questions elements are part of a template for an FAQ, and elements like title, involved people, introduction/purpose, time span, and progress are part of a template for a report. The steps can be typed in by the user, or selected from existing elements. Content from chat entries, todo-notes, notes, or other special elements from the chat messages can be used to fill the template structure as illustrated in FIG. 7(b). In the manual mode, the user selects these entries in a selection screen as illustrated in FIG. 7(c). After adding content, the content can be rearranged and edited. Finished documents can be extended with other versions creating hypermedia documents in the process.

Figure 8:
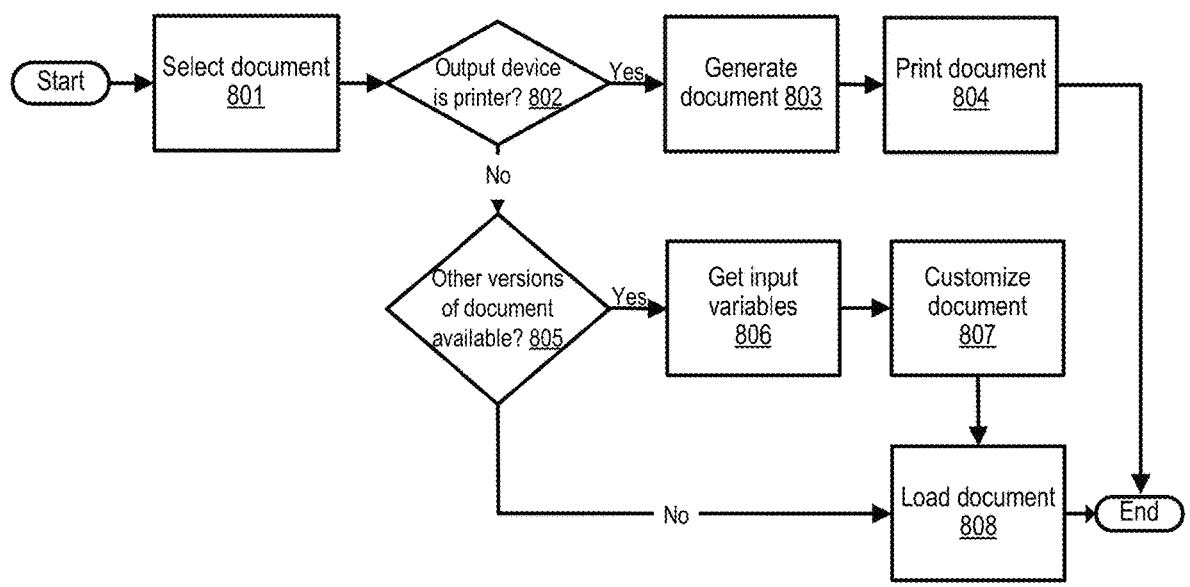
FIG. 8 illustrates the flow diagram for document preparation, assembly and presentation, in accordance with an example implementation.

FIG. 8 illustrates the flow diagram for document preparation and generation, in accordance with an example implementation. At 801, an interface is provided to facilitate the selection of a document. For example, the user can select a document in the overview tab. At 802, a determination is made as to whether the output device is a printer. If so (Yes), the flow proceeds to 803, wherein the document is generated from the multimedia document. In example implementations, for each video, key frames are extracted and added to the document. For each audio, the text is extracted and added to the document. At 804, the document is printed or downloaded to the local device if no printer is available.

If the output device is not a printer (No), then a determination is made as to whether different versions of the document is available at 805. If so (Yes), then an interface is provided to get input variables at 806. In example implementations, input variables for the document customization interface can include screen resolution, available bandwidth, device language, knowledge of user, gender of user, desired level of interactivity (e.g., low/high), paths taken through the same document by other users, and others depending on the desired implementation. Some of the input variables can be determined automatically from the device, some are based on knowledge about the user, and some may require user input (e.g., in the beginning of the usage). The flow proceeds to 807 to customize the document based on the input variables. Contents are adapted and paths in the hypermedia document may be preselected.

At 808, the document is loaded into the viewer where the user can watch or extend the document. The extension process may be uncontrolled, author-controlled, or user-controlled.

In example implementations, there can be content collection and chat application. Example implementations facilitate the connection and synchronization of several tools offering a huge variety of features. Besides searching in a chat, it is also possible to search in shared files which are indexed and archived once in the application. Messages can be marked for future reminders. Example implementations thereby allow for the structuring of chats or the marking elements of chats as important elements directly from the chat view.

Figure 9:
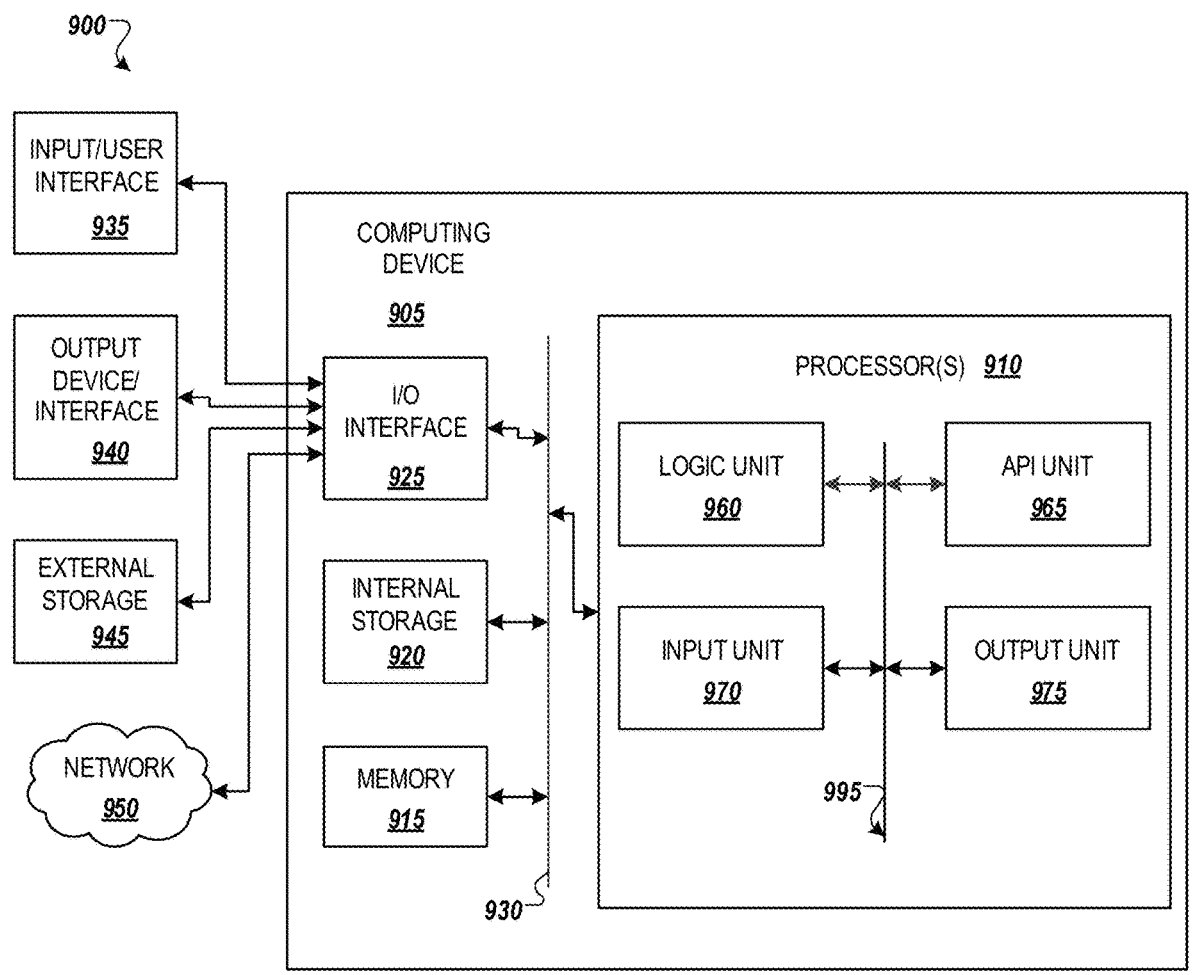
FIG. 9 illustrates an example computing environment with an example computer device suitable for use in example implementations.

FIG. 9 illustrates an example computing environment with an example computer device suitable for use in example implementations. Computer device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computer device 905.

Computer device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905. In example implementations involving a touch screen display, a television display, or any other form of display, the display is configured to provide a user interface as illustrated, for example, at FIGS. 2(a) to 2(e), and 7(a) to 7(c).

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via I/O interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Memory 915 may be configured to store or manage algorithms to be executed by processor(s) 910 as described in the flow, for example, at FIGS. 1, 3-6 and 8. The example implementations as described herein may be conducted singularly, or in any combination of each other according to the desired implementation and are not limited to a particular example implementation.

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided. Processor(s) 910 can be in the form of physical processors or central processing units (CPU) that is configured to execute instructions loaded from Memory 915.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, input unit 970, output unit 975, in some example implementations described above. For example, the flow of one or more processes or implementations may be controlled by logic unit 960 alone or in conjunction with API unit 965. The input unit 970 may be configured to obtain input for the calculations described in the example implementations, and the output unit 975 may be configured to provide output based on the calculations described in example implementations.

In example implementations, processor(s) 910 may be configured to display a first message transmitted from the mobile device on the user interface. In an example implementation as shown in FIG. 2(*a*), the messages 201 transmitted from the mobile device to other devices at 201 are placed on display, wherein the processor(s) 910 monitor for one or more second messages from the other mobile devices that are responsive to the first messages transmitted from the mobile device. On receipt of second messages from other mobile devices, processor(s) 910 are configured to generate, on the first message displaying on the user interface, a user interface indicator and provide a relationship interface between the first message and the second message on the user interface. The user interface indicator can be configured to provide the relationship interface as one of a thread and sub-thread interface as shown in FIG. 2(*c*), a color coded relationship interface as shown in FIG. 2(*d*), and a generation of a separate screen as shown in FIG. 2(*e*). As shown in FIG. 2(*c*) to 2(*e*), such indicators may take the form of a plus symbol, an arrow, a Q symbol, and so on depending on the desired implementation.

In the example of FIG. 2(*c*), when the user interface indicator is configured to provide the relationship interface as a thread and sub-thread interface, processor(s) 910 are configured to generate the user interface indicator by: displaying the first message as a start of a thread, providing the user interface indicator as an indication to expand the thread (e.g., in the form of a Q symbol, a plus symbol, etc.), and on receipt of an input on the user interface indicator, displaying the second message as a sub-thread through an expansion of the thread on the user interface as illustrated by the responses to the first messages as shown in FIG. 2(*c*). Further, this example implementation can extend to multiple messages as shown in the example of multiple transmitted messages in FIG. 2(*a*), whereupon multiple messages related to the transmitted messages can be displayed as sub-threads through an expansion of the thread on the user interface as shown in FIG. 2(*c*).

In the example of FIG. 2(*d*), when the user interface indicator is configured to provide the relationship interface as a color coded relationship interface, processor(s) 910 are configured to generate the user interface indicator by displaying the first message as a first color, providing the user interface indicator as an indication to move to a next message having the first color, and on receipt of an input on the user interface indicator, displaying the second message as the next message with the first color. Messages displayed in a second color different from the first color are categorized as being in a different relationship than the first message.

In the example of FIG. 2(*e*), when the user interface indicator is configured to provide the relationship interface as a separate screen, processor(s) 910 are configured to generate the user interface indicator by providing the relationship interface as a generation of a separate screen, processor(s) 910 are configured to generate the user interface indicator by displaying the first message on a first display screen, providing the user interface indicator as an indication to change to a second screen (e.g., as an arrow), and on receipt of an input on the user interface indicator, changing the first display screen to a second display screen and displaying the second message on the second display screen as shown in the right side of FIG. 2(*e*).

In example implementations, the first message can be in the form of a location based reminder configured to be transmitted to the another mobile device when the other mobile device reaches a location associated with the location based reminder. In an example implementation, the message can be transmitted to the another mobile device, but not displayed on the another mobile device until the another mobile device detects that it is at the location indicated in the first message, and at the designated time. In example implementations, the message can be either time reminder based, or location reminder based only depending on the desired implementation.

In example implementations, the first message can require a task for completion, and the second message can include at least one of a text, a video and an image responsive to the task for completion. That is, the user of the mobile device can indicate a requirement for an image or a video for the task to clear, and upon receipt of the video or image, the user can confirm if the task has been met. If the user decides that the task has been met, then the user can clear the message from the another mobile device through a confirmation interface (e.g. reply message, user interface for indicating task has been met, etc.).

In example implementations, processor(s) 910 can be configured to provide a second user interface indicator comprising an interface to generate a document based on the first messages and the second messages as shown in FIGS. 7(*a*) to 7(*c*). On receipt of an input on the second user interface indicator, the processor(s) 910 are configured to process a selection of the first messages and the second messages on a document editor as shown at FIGS. 7(*a*) to 7(*c*), and generate a document for the selected first messages and the second messages processed from the document editor as described in the flow of FIG. 8. For example, as described in FIG. 4 and FIG. 8, processor(s) 910 can be configured to generate the document for the selected first messages and the second messages by retrieving one or more images associated with the second messages and incorporating the images into the document (e.g., from downloading the images or video keyframes from the internet or from a message server). In an example implementation, processor(s) 910 are configured to generate the document for the selected first messages and the second messages by retrieving one or more videos associated with the second messages; extracting one or more key frame images from the one or more videos; and incorporating the one or more key frame images into the document. The extraction of key frame images can be done according to any desired implementation known in the art. Further, the processor(s) 910 can be configured to generate the document by printing the document on a printer as illustrated in FIG. 8.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A non-transitory computer readable medium, storing instructions for executing a process for managing messages on a device, the instructions comprising:

displaying a plurality of messages posted on a chat timeline on a first display screen, the plurality of messages comprises a first message, and a third message that is not a response to the first message, wherein the plurality of messages are sorted based on time posted;

generating a user interface indicator on the first display screen upon receipt of a second message that is a response to the first message, the user interface indicator is indicative of presence of the second message and is placed at a position that corresponds to the first message on the first display screen;

creating a thread comprising the first message and the second message on a second display screen while keeping the first message displayed in the first display screen;

changing the first display screen to the second display screen on receipt of an instruction on the user interface indicator placed at the position that corresponds to the first message on the first display screen, the second display screen is a separate screen from the first display screen, wherein the second message is not displayed on the first display screen, wherein, the first display screen and the second display screen are not displayed simultaneously, and either the first display screen or the second display screen is displayed on the device at a time, wherein either the first display screen or the second display screen is displayed in full screen on the device at a time, and wherein a count of unread second messages for the first message is displayed on the first display screen if one or more unread second messages are present, wherein selection of the first message on the first display screen triggers a display change from the first display screen to the second display screen, and jumps to a first unread second message of the one or more unread second messages in the second display screen.

2. The non-transitory readable medium of claim 1, wherein the second display screen displays the first message, the second message, and subsequent messages that are responses to the first message.

3. The non-transitory readable medium of claim 2, wherein the third message is not displayed on the second display screen.

4. The non-transitory computer readable medium of claim 1, wherein a message inputted on the second display screen is a response to the first message and is displayed on the second display screen.

5. The non-transitory computer readable medium of claim 1, further comprising:
performing an action on a message of the plurality of messages on the first display screen to create a thread, with the message becomes the first message after the action is performed.

6. The non-transitory computer readable medium of claim 5, further comprising creating, in the thread, a sub-thread from the second message.

7. A method for managing messages on a device, the method comprising:
displaying a plurality of messages posted on a chat timeline on a first display screen, the plurality of messages comprises a first message, and a third message that is not a response to the first message, wherein the plurality of messages are sorted based on time posted;
generating a user interface indicator on the first display screen upon receipt of a second message that is a response to the first message, the user interface indicator is indicative of presence of the second message and is placed at a position that corresponds to the first message on the first display screen;
creating a thread comprising the first message and the second message on a second display screen while keeping the first message displayed in the first display screen;
changing the first display screen to the second display screen on receipt of an instruction on the user interface indicator placed at the position that corresponds to the first message on the first display screen, the second display screen is a separate screen from the first display screen, wherein the second message is not displayed on the first display screen,
wherein, the first display screen and the second display screen are not displayed simultaneously, and either the first display screen or the second display screen is displayed on the device at a time,
wherein either the first display screen or the second display screen is displayed in full screen on the device at a time, and
wherein a count of unread second messages for the first message is displayed on the first display screen if one or more unread second messages are present,
wherein selection of the first message on the first display screen triggers a display change from the first display screen to the second display screen, and jumps to a first unread second message of the one or more unread second messages in the second display screen.

8. The method of claim 7, wherein the second display screen displays the first message, the second message, and subsequent messages that are responses to the first message.

9. The method of claim 8, wherein the third message is not displayed on the second display screen.

10. The method of claim 7, wherein a message inputted on the second display screen is a response to the first message and is displayed on the second display screen.

11. The method of claim 7, further comprising: performing an action on a message of the plurality of messages on the first display screen to create a thread, with the message becomes the first message after the action is performed.

12. The method of claim 11, further comprising creating, in the thread, a sub-thread from the second message.

13. A system, comprising:
a display configured to display a user interface;
at least one memory configured to store instructions; and
at least one processor coupled to the memory and configured to execute the instructions to:
display a plurality of messages posted on a chat timeline on a first display screen of the user interface, the plurality of messages comprises a first message, and a third message that is not a response to the first message, wherein the plurality of messages are sorted based on time posted;
generate a user interface indicator on the first display screen upon receipt of a second message that is a response to the first message, the user interface indicator is indicative of presence of the second message and is placed at a position that corresponds to the first message on the first display screen;
create a thread comprising the first message and the second message on a second display screen while keeping the first message displayed in the first display screen; and
change the first display screen to the second display screen on receipt of an instruction on the user interface indicator placed at the position that corresponds to the first message on the first display screen, the second display screen is a separate screen from the first display screen,
wherein the second message is not displayed on the first display screen,
wherein, the first display screen and the second display screen are not displayed simultaneously, and either the first display screen or the second display screen is displayed on the display at a time,
wherein either the first display screen or the second display screen is displayed in full screen on the display at a time, and
wherein a count of unread second messages for the first message is displayed on the first display screen if one or more unread second messages are present,
wherein selection of the first message on the first display screen triggers a display change from the first display screen to the second display screen, and jumps to a first unread second message of the one or more unread second messages in the second display screen.

14. The system of claim 13, wherein the second display screen displays the first message, the second message, and subsequent messages that are responses to the first message.

15. The system of claim 14, wherein the third message is not displayed on the second display screen.

16. The system of claim 13, wherein a message inputted on the second display screen is a response to the first message and is displayed on the second display screen.

17. The system of claim 13, further comprising: performing an action on a message of the plurality of messages on the first display screen to create a thread, with the message becomes the first message after the action is performed.

18. The system of claim 17, further comprising creating, in the thread, a sub-thread from the second message.

* * * * *